United States Patent
Bohan

(10) Patent No.: US 10,213,671 B2
(45) Date of Patent: Feb. 26, 2019

(54) IPROGRAMMABLE ELECTRONIC SPORTS TARGET SYSTEM

(71) Applicant: Tom Bohan, Westlake, OH (US)

(72) Inventor: Tom Bohan, Westlake, OH (US)

(*) Notice: Subject to any disclaimer, the term of this patent is extended or adjusted under 35 U.S.C. 154(b) by 55 days.

(21) Appl. No.: 15/344,965

(22) Filed: Nov. 7, 2016

(65) Prior Publication Data

US 2017/0128807 A1    May 11, 2017

Related U.S. Application Data

(60) Provisional application No. 62/251,793, filed on Nov. 6, 2015.

(51) Int. Cl.
| | |
|---|---|
| *A63B 63/00* | (2006.01) |
| *A63B 69/00* | (2006.01) |
| *H04L 29/08* | (2006.01) |
| *A63B 71/06* | (2006.01) |
| *A63B 24/00* | (2006.01) |

(52) U.S. Cl.
CPC ...... *A63B 69/0053* (2013.01); *A63B 24/0075* (2013.01); *A63B 63/004* (2013.01); *A63B 71/0622* (2013.01); *H04L 67/12* (2013.01); *H04L 67/125* (2013.01); *A63B 71/0669* (2013.01); *A63B 2024/0037* (2013.01); *A63B 2071/063* (2013.01); *A63B 2071/0625* (2013.01); *A63B 2207/02* (2013.01); *A63B 2209/10* (2013.01); *A63B 2210/50* (2013.01); *A63B 2220/30* (2013.01); *A63B 2220/53* (2013.01); *A63B 2220/64* (2013.01); *A63B 2220/801* (2013.01); *A63B 2220/806* (2013.01); *A63B 2220/808* (2013.01); *A63B 2220/833* (2013.01); *A63B 2225/20* (2013.01); *A63B 2225/50* (2013.01); *A63B 2225/62* (2013.01)

(58) Field of Classification Search
CPC ............ A63B 63/004; A63B 2024/004; A63B 71/0622; A63B 2220/833; A63B 2225/50; A63B 69/0053; A63B 24/0075
See application file for complete search history.

(56) References Cited

U.S. PATENT DOCUMENTS

| | | | |
|---|---|---|---|
| 6,551,205 B1 * | 4/2003 | Koelzer, Jr. ............ | A63B 63/00 473/454 |
| 7,252,604 B2 * | 8/2007 | Birss .................... | A63B 63/003 273/392 |

(Continued)

*Primary Examiner* — Jay Trent Liddle
(74) *Attorney, Agent, or Firm* — Daniel M. Cohn; Howard M. Cohn

(57) ABSTRACT

A programmable electronic sports target system. The system includes one or more target devices mounted to a goal with a net. Each of the one or more target devices has a programmable module disposed therein for controlling and operating the one or more target devices. A remote control system containing a computer and a database is connected to each programmable module to receive target sensor data from the programmable module of each of the one or more target devices for analyzing the data and for transmitting operational control data to the programmable module for operational control of the target devices having the programmable module disposed therein. Target application software within mobile communications devices receives target sensor data from the remote control device and to transmit operational control data to the remote control device.

20 Claims, 3 Drawing Sheets

(56) References Cited

U.S. PATENT DOCUMENTS

| | | | |
|---|---|---|---|
| 7,407,452 B1* | 8/2008 | Gawthrop | A63B 63/003 |
| | | | 473/422 |
| 8,109,845 B2 | 2/2012 | Duty | |
| 9,791,246 B2* | 10/2017 | D'Andrade | A63B 69/0024 |
| 2003/0181268 A1* | 9/2003 | Nelson | A63B 24/0021 |
| | | | 473/480 |
| 2007/0184920 A1* | 8/2007 | Mah | A63B 63/004 |
| | | | 473/446 |
| 2012/0010027 A1* | 1/2012 | Morris | A63B 69/002 |
| | | | 473/420 |
| 2013/0065712 A1* | 3/2013 | Morris | A63B 69/002 |
| | | | 473/420 |
| 2016/0098941 A1* | 4/2016 | Kerluke | G06F 3/017 |
| | | | 700/91 |
| 2016/0107057 A1* | 4/2016 | Wisegarver | A63B 71/0605 |
| | | | 473/446 |

* cited by examiner

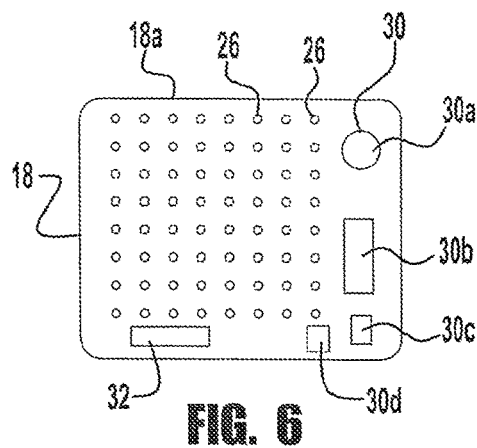
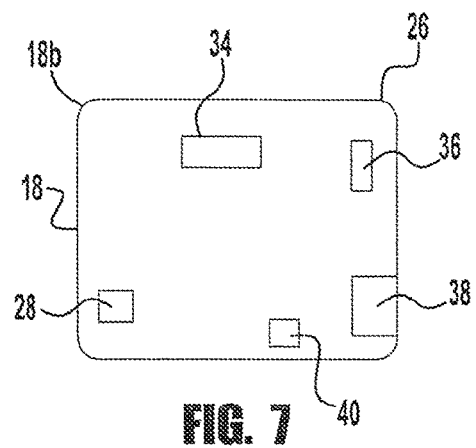
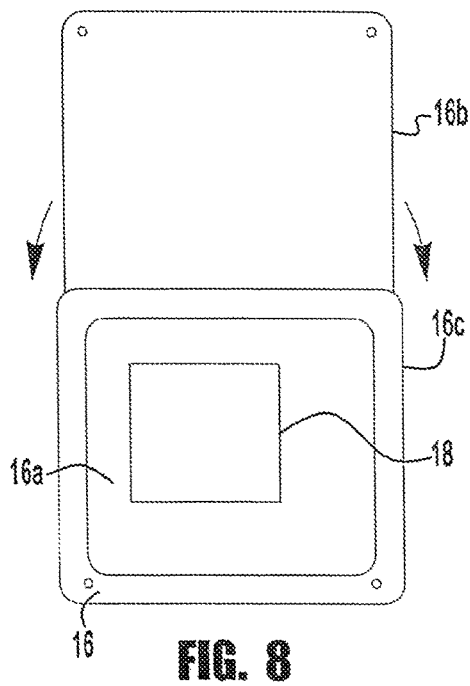
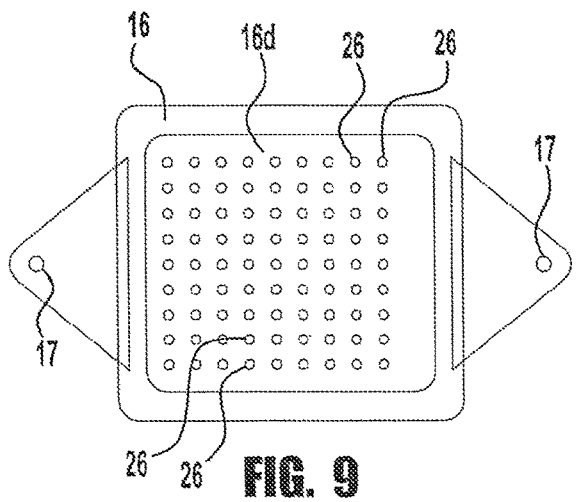

IPROGRAMMABLE ELECTRONIC SPORTS TARGET SYSTEM

CROSS-REFERENCE TO RELATED APPLICATIONS

This application claims the benefit of U.S. Provisional Patent Application No. 62/251,793 filed on Nov. 6, 2015 which is incorporated in its entirety herein by reference.

BACKGROUND OF THE INVENTION

A number of sports require the player to accurately direct a sports object such as a lacrosse ball, field hockey ball, soccer ball or hockey puck to a specific location at a specific time in order to be proficient at scoring. For example, lacrosse utilizes goals containing frames and nets as backdrops, which are set up at opposite ends of a field as established target devices. Players attempt to direct the lacrosse ball into the concave end of the goal in order to score. The goal is protected by a goalie who attempts to obstruct the directed sports object and prevent it from entering the concave goal area. In order to exercise accuracy, players use target devices mounted on or in front of goals in a practice setting. Additionally, some sports require repetitive practice throwing or kicking a sports object against a rebounding surface to develop stick or foot skills.

Current sports goal target devices consist of a flat or semi-flat surface extending across the goal opening that contain holes or open spaces that act as a target to shoot the ball at, through and or into the net. The current target systems are designed to measure shooting accuracy by preventing the ball from entering the net or goal if the ball is not directed to the specific and fixed opening accurately. In other sports goal target devices, the target devices are mounted on the goal frame and extend in front of the concave goal to prevent the directed sports object from entering the net or mounted on the net and directly impacted by the sports object.

SUMMARY OF THE INVENTION

According to an embodiment of the present invention, there is disclosed a programmable electronic sports target system. The system includes one or more target devices mounted to a goal with a net. Each of the one or more target devices has a programmable module disposed therein for controlling and operating the one or more target devices. A remote control system containing a computer and a database is connected to each programmable module to receive target sensor data from the programmable module of each of the one or more target devices for analyzing the data and for transmitting operational control data to the programmable module for operational control of the target devices having the programmable module disposed therein. Target application software within mobile communications devices receives target sensor data from the remote control device and to transmit operational control data to the remote control device.

According to another embodiment of the present invention, there is disclosed a method of improving control, accuracy and timing by a user when directing a ball at a goal while responding to various cues from one or more target devices. The method includes providing one or more target devices mounted to the goal, each having a programmable module disposed therein. Connecting each of the programmable modules to a remote control system containing a computer and a database. Receiving target sensor data from the programmable module of each of the one or more target devices at the remote control system. Analyzing and storing the target sensor data received from the one or more target devices with the computer and the database. Transmitting operational control data from the computer and the database to the programmable module for operational control of the target devices having the programmable module disposed therein.

ASPECTS OF THE INVENTION

An aspect of the invention, is for a net used in a net sport like Hockey, Lacrosse, Soccer, Field Hockey, etc., to provide a target that measures and records the impact of a projectile such as a ball using sensors and indicates shooting activity using colored lights. This can be accomplished by attaching electronic devices and cushions that protect and attach the devices to the back of the net, allowing the net to limit some of the force of the ball or directed sports object that might otherwise damage the electronic device.

Another aspect of the invention, relates to a protective target called a target device, that contains a programmable module that contains LED lighting, sensors and communications electronics.

Still another aspect of the invention, relates to a programmable electronic sports target system that contains an inflatable target that mounts to the back of a net secured to a sports goal or sports rebounder by attaching it to the frame or net with fastening devices such as straps, ties, elastic bands or cords, or other fasteners.

Yet another aspect of the invention, relates to a programmable electronic sports target system that contains one or more inflatable target devices that hold and protect the electronic program module(s).

Another aspect of the invention, relates to a programmable electronic sports target system that contains a programmable electronic module that illuminates the target in various colors and sequences.

Still another aspect of the invention, relates to a programmable electronic sports target system that includes a sensor used to measure sound at certain decibel ranges to determine an impact or a miss of a ball.

An aspect of the invention, relates to a programmable electronic sports target system that contains a sensor that measures impact of a ball on the target.

Yet another aspect of the invention, relates to a programmable electronic sports target system that contains a sensor that measures vibration in the target.

A still further aspect of the invention, relates to a programmable electronic sports target system that contains a sensor that measures the directed objects velocity.

Another aspect of the invention, relates to a programmable electronic sports target system that contains a sensor that measures the directed objects trajectory.

An aspect of the invention, relates to a programmable electronic sports target system that contains a camera sensor that records the player or players.

Another aspect of the invention, relates to a programmable electronic sports target system that contains a counter that counts hits and misses.

Yet another aspect of the invention, relates to a programmable electronic sports target system that contains a communications device, such as (Bluetooth, RF or Wi-Fi) to connect the target to a remote access device.

Still another aspect of the invention, relates to a programmable electronic sports target system that contains a module that is programmable and contains RGB LED modules.

An additional aspect of the invention, relates to a programmable electronic sports target system that contains one or more target devices that can be linked together electronically with wires or wirelessly.

Another aspect of the invention, relates to a programmable electronic sports target system that uses colored lights to direct or signal actions.

A yet another aspect of the invention, relates to a programmable electronic sports target system that includes lights that are activated in time based sequences.

An aspect of the invention, relates to a programmable electronic sports target system that includes lights that are activated by RF or IR remote control.

Another aspect of the invention, relates to a programmable electronic sports target system that includes lights that are activated by output from sensors.

A still additional aspect of the invention, relates to a programmable electronic sports target system that includes a module that collects and stores data.

Another additional aspect of the invention, relates to a programmable electronic sports target system that includes a module that communicates data via an output device.

An aspect of the invention, relates to a programmable electronic sports target system that is connected to a internet based community via a software application and interface device.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

FIG. 6 is a front view of the programmable module, in accordance with the present invention.

FIG. 7 is a rear view of the programmable module, in accordance with the present invention.

FIG. 8 is a rear view of the target and the programmable module of the programmable electronic sports target system, in accordance with the present invention.

FIG. 9 is a front view of the target of the programmable module of the programmable electronic sports target system, in accordance with the present invention.

DETAILED DESCRIPTION OF THE PREFERRED EMBODIMENTS

A large variety of sports involve directing a sports object or projectile such as a lacrosse ball, field hockey ball, soccer ball or hockey puck at or into, a goal bearing a net as a backdrop or a fabric or net based rebound device. There is a need for a sports target system that is easily installable, configurable and portable, is easy to use, and effectively improves skills both physically and cognitively, while measuring improvement by collecting data and delivering and presenting the data to an individual or community.

Figure 1:
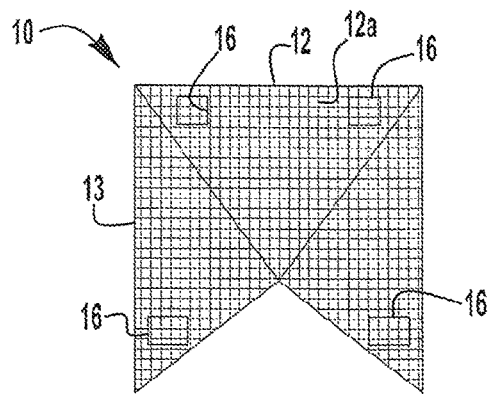
FIG. 1 is a front view of the programmable electronic sports target system, mounted on the back of a lacrosse goal, in accordance with the present invention.

The programmable electronic sports target system 10 (hereafter "target system"), see FIG. 1, is designed to provide users with the ability to improve control, accuracy and timing when directing a sports object, i.e. a ball, at a goal 12 or rebound device 14 (see FIG. 4) while responding to various illumination or audible cues from the target devices 16. The target system 10 incorporates easily installable, programmable illuminated target or multiple target devices 16, each containing an internal programmable module 18 which incorporates LED lights 26, and sensors and communications devices embedded in a durable protective cushion that attaches to the back surface of the sports goal nets 12 or rebounding devices 14.

The purpose of the target system 10 is to provide users with the ability to improve control, accuracy and timing by responding to various illumination or audible cues from the target devices 16 when directing the sports object at the goal 12 or the rebound device 14. The target devices 16 will provide an interactive environment that improves the self directed training experience or enables a controlled environment for accurate measurement during player development. The target device 16 can be controlled by remote interface from a Bluetooth or a Wi-Fi enabled device or a RF or IR remote control. The ability of the target devices 16 to deliver data wirelessly to an internet enabled application will further enhance the interactive environment and allow for players to compete with other users to create a connected community of users.

Figure 2:
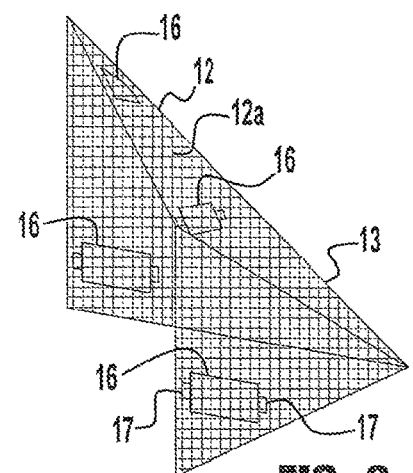
FIG. 2 is a side, perspective view of the programmable electronic sports target system, mounted on the back of a lacrosse goal, in accordance with the present invention.
Figure 3:
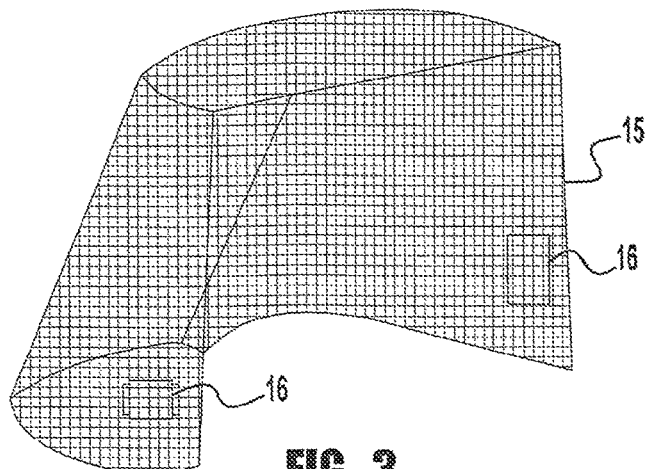
FIG. 3 is a front, perspective view of the programmable electronic sports target system mounted to a hockey goal, in accordance with the present invention
Figure 4:
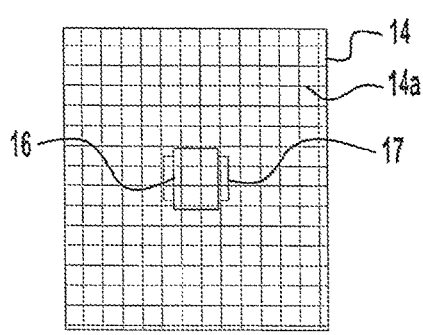
FIG. 4 is a rear view of a target of the programmable electronic sports target system mounted on the back of the net or fabric of a rebound device, in accordance with the present invention.

FIGS. 1 and 2 illustrate the target system 10 which is mounted to a goal 12, illustrated as a lacrosse goal 13. However, it is within the terms of the invention to utilize any type of goal 12 with a net, such as a hockey goal 15, as seen in FIG. 3. The target system 10 includes one or more target devices 16, which are controlled and operated with an internal programmable module 18, as shown in FIG. 8. The target devices 16 may either be independent or connected together. The target devices 16 can be made in various shapes or sizes and of protective, durable impact resistant material or of an inflatable material constructed of polymer or polymer coated fabric that is designed to protect the electronic module that is contained within the target. The target devices 16 can create a loud sound when impacted by the directed sports object. As noted, the target system 10 may also be used in conjunction with a net 14a in a rebound device 14, as seen in FIG. 4. The target devices 16 can be mounted to the front or rear of the net. By attaching the electronic target devices to the rear of the net, the net tends to cushion the target devices allowing the net to limit some of the force of the ball or directed sports object that might otherwise damage the electronic device.

Each of the one or more target devices 16 are mounted to the net 12a of the goal 12. The target devices 16 may be mounted in any desired manner, such as with flaps 17, illustrated in FIG. 3. Further, the target devices may be placed in any appropriate positions, such as the sides and rear of the net 12a, as seen in FIGS. 1 and 2.

Figure 5:
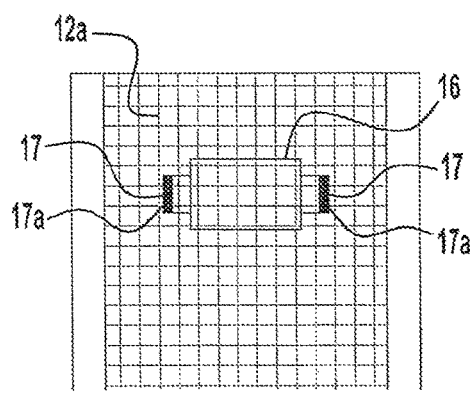
FIG. 5 is a front view of a target of the programmable electronic sports target system mounted on a net of a rebound device, in accordance with the present invention.

FIG. 5 illustrates the target 16 attached to the net 12a of the goal 12 utilizing flaps 17. The flaps 17 incorporate a binding technique, such as Velcro strips 17a, that allow the flaps to be removably secured to the net 12a. However, it should be noted that any desired mounting technique may be employed, such as straps, ties, elastic bands or cords, or other fasteners to secure the target 16 to the net 12a.

As seen in FIG. 8, the internal programmable module 18 controls the target 16 and is designed to illuminate the target using white or colored LED lights 26 after being placed within the target, as seen in FIG. 9. FIG. 8 illustrates a front view of the internal programmable module 18. The module 18 is programmed to sequence illuminating different color LED lights 26, shown in FIG. 6, to signal the player to react quickly and direct the ball at the appropriately lighted target 16 when the target is illuminated with a specific lighted color. The color and timing sequence of LED lights 26 can be controlled in a variety of possible ways.

As seen in FIG. 7, switch 28 on the rear 18b of the module 18 can be used to select pre-determined programs that are stored in the programmable device.

Alternatively, the LED lights 26 can be programmed via various remote Wi-fi or Bluetooth enabled interface devices such as smart phones or computers, or IR or RF remote controls illuminate specific colors in specific time based sequences to signal and direct different response events to the player.

The programmable module 18 may also contain a number of sensors 30. As seen on the front 18a of the programmable module 18 in FIG. 6, a sensor 30a can be provided to measure the impact or failure to impact the target with the directed sports object, sensor 30b can measures the speed or velocity of the directed sports object, sensor 30c can measure the accuracy of the directed sports object impacting the target and the sensor 30d can measure the reaction time and/or cognitive ability of the player. The sensor 30 can also be a camera sensor to record a specific player in combination with the measurement from one or more of the other sensors 30. The programmable module 18 may also contain a speaker 32 that provides voice or sound based commands that can provide directions to the player. The sensor so can also to measure sound at certain decibel ranges to determine whether a ball has impacted the target device.

As seen in FIG. 7, the programmable module 18 also contains an LCD display 34 to record impact hits and misses, a communications device 36 for connecting the module 18 to other target devices in the target system, a power switch 38 and a USB connection 40 to connect the programmable module 18 to a computer in a data server 52 for storing data collected from the one or more programmable modules.

The programmable module 18 may connect to other programmable modules within other target devices 16 of the target system 10 via wireless or wired communication, creating a linked target system. The programmable module(s) 18 may connect to a remote control system 50 via infrared, radio frequency, Bluetooth or Wi-Fi remote control. The programmable module 18 will record and store date that can be downloaded or pushed out via Bluetooth, Wi-Fi or direct connection for data analysis and presentation. The programmable module 18 can connect to a software application that collects data or controls the device.

Figure 10:
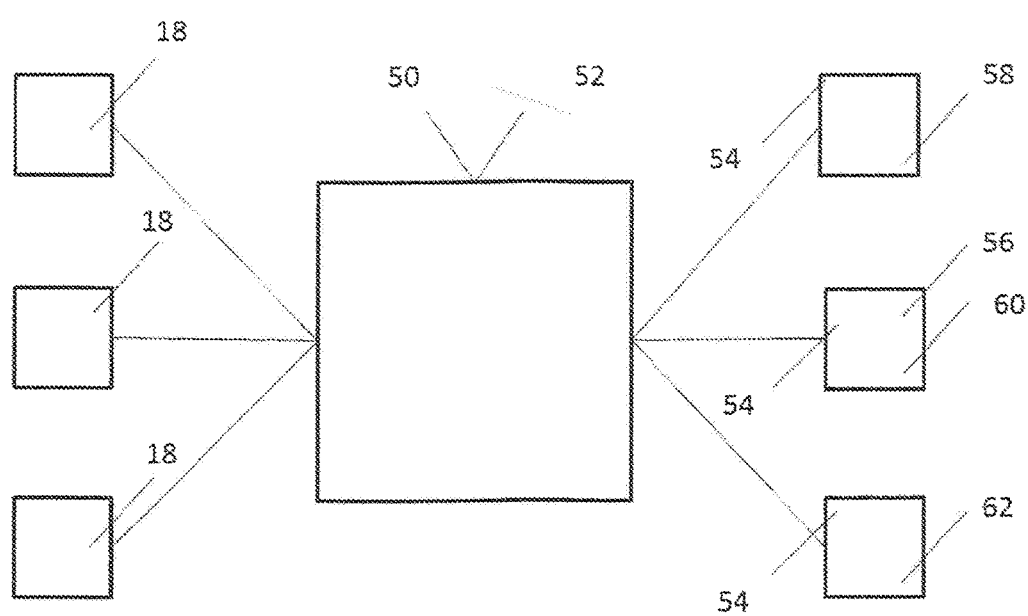
FIG. 10 is a schematic of programmable electronic sports target system, in accordance with the present invention

As illustrated in FIG. 10, the programmable electronic sports target system 10 includes a remote control system 50 such as a data server 52, which contains a computer and a database, that is typically wirelessly interconnected with the plurality of programmable module 18 via infrared, radio frequency, Bluetooth or Wi-Fi remote control. The data server 52 of the remote control system transmits target sensor data received from the plurality of programmable module 18 to users of the programmable electronic sports target system. Preferably, users download target application software 54 to their mobile communications devices 56, such as smart phones 58, tablet devices 60, or other mobile communications devices 62. The data server 52 can transmit desired data to the target application software 54 where users can obtain this data through their mobile communications devices 56. In addition, all of the data can be stored on the data server where it can be retrieved later. The target application software 54 can be installed into the mobile communications devices 56 of each individual that is participating in use of the programmable electronic sports target system 10.

Further, the target application software 54 can control and manipulate the plurality of programmable modules 18 with the remote control system 50. A user can enter specific commands into the target application software 54 with directives for the programmable modules 18. This operational control data is transmitted to the data server 52. Then, the data server 52 transmits this information to the plurality of programmable modules 18, which receive the information and control the target devices 16, as discussed in more detail above.

As seen in FIG. 8, the target 16 includes a cavity 16a. The programmable module 18 is secured within the cavity 16a. Once the programmable module 18 is placed inside cavity 16a, enclosure flap 16b is folded over the cavity 16a and attached to the rear 16c of the target 16. Flap 16b can include a fastening device to attach the inflatable target 16 to the 12a or net 14a as shown in FIGS. 1 and 4, respectively. As seen in FIG. 9, the programmable module 18 shines through a transparent front panel 16d of the target 16 illuminating the front of the target.

In use, the player directs a ball or other projectile towards a lit target 16 mounted to the goal 12 or rebounder 14. The target 16 will then register a hit or a miss dependent on whether target is impacted by the ball or other projectile in the area of the net 12a or 14a to which target is attached directly behind. The net 12a or 14a may stretch from the force of the ball moving the net back. The target 16 will also move with the net 12a or 14a that it is attached to. The net 12a or 14a will reach its maximum stretch point limiting the force transfer from the ball into target 16.

When target 16 is impacted directly by the ball, the impact sensors 30a will register the impact as a hit on LED display 34 which has digits assigned to register hits sequentially. When target 16 is not impacted directly by the ball but on another area of the goal 12, the impact sensors 30a will register a miss on the LED display 34 which has digits assigned to register misses sequentially. Further, any other pertinent information may be collected with the various other sensors 30, such as speed or velocity of the ball, accuracy of the impact, and reaction time and/or cognitive ability of the player. The programmable module 18 will record and store data that can be downloaded or pushed out via Bluetooth, Wi-Fi or direct connection for data analysis and presentation by means such as a computer monitor connected to the computer in the data server 52. The programmable module 18 can connect to a software application that collects data or controls the device via Bluetooth, Wi-Fi, Radio Frequency (RF) or Infrared (IR) controllers and publishes data to an online community of users.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A programmable electronic sports target system, comprising:
    a goal having a net secured thereto;
    one or more target devices mounted to a back surface of the net;
    each of the one or more target devices being constructed of an inflatable material forming a cavity with an enclosure flap folded over the cavity;
    each of the one or more target devices having a programmable module disposed within the cavity and covered by the enclosure flap for controlling and operating the one or more target devices;
    a remote control system containing a computer and a database connected to each programmable module to receive target sensor data from the programmable module of each of the one or more target devices for analyzing the data and for transmitting operational control data to the programmable module for operational control of the one or more target devices having the programmable module disposed therein; and
    target application software downloaded to a user's mobile communications device to receive target sensor data from the one or more target devices and to transmit operational control data to the one or more target devices.

2. The programmable electronic sports target system of claim 1 wherein the programmable module in the one or more target devices contains LED lighting, a number of sensors and a communication device.

3. The programmable electronic sports target system of claim 1 wherein the one or more target devices mount to the back surface of the net, outside of the goal, whereby the one or more target devices is secured to the back surface of the net with a fastening device selected from a group consisting essentially of straps, ties, elastic bands and cords.

4. The programmable electronic sports target system of claim 3 wherein the one or more target devices are inflatable and made of protective, durable impact resistant material to protect the programmable module that is contained within the cavity and covered by the enclosure flap of the one or more target devices, and wherein the enclosure flap is transparent so that the programmable module shines through the front panel to illuminate the front of the one or more target devices.

5. The programmable electronic sports target system of claim 2 wherein the programmable module in the one or more target devices is programmed to illuminate different color LED lights in a sequence to signal a player to react quickly and direct a ball at an appropriately illuminated target device.

6. The programmable electronic sports target system of claim 2 wherein one of the number of sensors in the one or more target devices measures sound generated by the ball impacting the one or more target devices.

7. The programmable electronic sports target system of claim 2 wherein one of the number of sensors in the one or more target devices measures trajectory, velocity, and impact of a ball on the one or more target devices.

8. The programmable electronic sports target system of claim 2 wherein the one or more target devices includes a camera sensor that records a player.

9. The programmable electronic sports target system of claim 2 wherein one of the number of sensors in the one or more target devices contains a counter that counts hits and misses of a ball.

10. The programmable electronic sports target system of claim 1 wherein the remote control system is wirelessly interconnected with each programmable module within the one or more target devices in the one or more target devices from the group consisting of infrared, radio frequency, Bluetooth and Wi-Fi remote control.

11. The programmable electronic sports target system of claim 10 wherein a data server of the remote control system transmits data received from each programmable module within the one or more target devices to users of the programmable electronic sports target system.

12. The programmable electronic sports target system of claim 11 wherein the data server transmits desired data to the target application software where users can obtain this data through the user's mobile communications device.

13. The programmable electronic sports target system of claim 12 wherein the target application software controls and manipulate each programmable module within the one or more target devices with the remote control system, whereby commands entered into the target application software are transmitted to the data server, and the data server transmits the operational control data to the plurality of programmable modules, which receives the operational control data and controls the one or more target devices.

14. A method of improving control, accuracy and timing by a user when directing a ball at a goal having a net secured thereto while responding to various cues from one or more target devices, comprising:
    providing one or more target devices being constructed of an inflatable material forming a cavity with an enclosure flap folded over the cavity, and mounted to a back surface of the net, each having a programmable module disposed within the cavity;
    connecting each of the programmable modules to a remote control system containing a computer and a database;
    receiving target sensor data from the programmable module of each of the one or more target devices at the remote control system;

analyzing and storing the target sensor data received from the one or more target devices with the computer and the database; and transmitting operational control data from the computer and the database to the programmable module for operational control of the one or more target devices having the programmable module disposed therein.

15. The method of claim 14 including providing target application software within mobile communications devices for receiving the target sensor data from the one or more target devices and for transmitting operational control data to the remote control device.

16. The method of claim 15 further including controlling and operating the programmable module disposed within the one or more target devices.

17. The method of claim 14 further including illuminating a sequence of different color LED lights with the operational control data to signal a player to react quickly and direct a ball at the appropriately illuminated target device.

18. The method of claim 14 further including obtaining target sensor data corresponding to sound generated by the ball impacting the one or more target devices.

19. The method of claim 14 further including obtaining target sensor data corresponding to trajectory, velocity, and impact of a ball on the one or more target devices.

20. The method of claim 14 further including obtaining target sensor data corresponding to a counter that counts hits and misses of a ball on the one or more target devices.

* * * * *